(12) United States Patent
Jiang et al.

(10) Patent No.: US 10,817,615 B2
(45) Date of Patent: Oct. 27, 2020

(54) METHOD AND APPARATUS FOR VERIFYING IMAGES BASED ON IMAGE VERIFICATION CODES

(71) Applicant: Alibaba Group Holding Limited, George Town, Grand Cayman (KY)

(72) Inventors: Bo Jiang, Hangzhou (CN); Guilin Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/073,151

(22) Filed: Mar. 17, 2016

(65) Prior Publication Data

US 2016/0275304 A1    Sep. 22, 2016

(30) Foreign Application Priority Data

Mar. 20, 2015  (CN) .......................... 2015 1 0124938

(51) Int. Cl.
| | |
|---|---|
| *H04L 29/06* | (2006.01) |
| *G06F 21/62* | (2013.01) |
| *G06F 21/31* | (2013.01) |
| *G06K 9/62* | (2006.01) |
| *G06F 21/36* | (2013.01) |

(52) U.S. Cl.
CPC ........ *G06F 21/6218* (2013.01); *G06F 21/316* (2013.01); *G06F 21/36* (2013.01); *G06K 9/6263* (2013.01); *G06F 2221/2133* (2013.01)

(58) Field of Classification Search
CPC ............. G06K 9/03; G06T 3/00; G08C 21/00
See application file for complete search history.

(56) References Cited

U.S. PATENT DOCUMENTS

| | | | |
|---|---|---|---|
| 6,862,610 B2 | 3/2005 | Shuster | |
| 7,548,890 B2 | 6/2009 | Shakkarwar | |
| 7,891,005 B1* | 2/2011 | Baluja | ..................... G06F 21/36 713/182 |
| 8,161,534 B2 | 4/2012 | Golle et al. | |

(Continued)

FOREIGN PATENT DOCUMENTS

| | | |
|---|---|---|
| CN | 103312512 | 9/2013 |
| CN | 104065666 | 9/2014 |

(Continued)

*Primary Examiner* — Joseph P Hirl
*Assistant Examiner* — Leynna Truvan

(57) ABSTRACT

The present invention provides a method and apparatus for verifying images based on image verification codes, the method comprising selecting an identification image and multiple candidate images from an image gallery, where the candidate image comprise interference images and correct images corresponding to the identification image. The method also includes providing hint information for the identification image, the candidate images, and relationships between the identification image and the correct images. The method also includes receiving selection information of images selected from the candidate images. The method also includes determining if the verification passed when the correct images are determined to have been selected based on the selection information or, determining that verification has failed when the correct images are determined not to have been selected based on the selection information.

17 Claims, 8 Drawing Sheets

(56) References Cited

U.S. PATENT DOCUMENTS

| | | | |
|---|---|---|---|
| 8,170,295 | B2 | 5/2012 | Fujii et al. |
| 8,223,968 | B2 | 7/2012 | Yoshioka et al. |
| 8,250,373 | B2 | 8/2012 | Hyser |
| 8,396,288 | B2 | 3/2013 | Hayashi |
| 8,483,518 | B2 | 7/2013 | Zhu et al. |
| 8,538,011 | B2 | 9/2013 | Moskowitz |
| 8,561,201 | B2 | 10/2013 | Kanai |
| 8,635,105 | B2 | 1/2014 | Pradeep et al. |
| 8,659,654 | B2 | 2/2014 | Tsang et al. |
| 8,717,288 | B2 | 5/2014 | Hildreth |
| 8,726,355 | B2 | 5/2014 | Shuster |
| 8,738,917 | B2 | 5/2014 | Wakao et al. |
| 8,762,724 | B2 | 6/2014 | Bravo et al. |
| 8,881,251 | B1 * | 11/2014 | Hilger .................. H04L 63/083 713/183 |
| 8,930,709 | B2 | 1/2015 | Navratil et al. |
| 9,043,941 | B2 | 5/2015 | Yamada et al. |
| 9,053,365 | B2 | 6/2015 | Gottemukkula et al. |
| 9,058,513 | B2 | 6/2015 | Irie |
| 9,058,519 | B2 | 6/2015 | Law et al. |
| 9,186,793 | B1 | 11/2015 | Meier |
| 9,275,303 | B2 | 3/2016 | Cvetkovic et al. |
| 2003/0177366 | A1 * | 9/2003 | de Jong .................. G06F 21/34 713/184 |
| 2008/0209223 | A1 | 8/2008 | Nandy et al. |
| 2009/0232351 | A1 | 9/2009 | Kigati et al. |
| 2010/0131409 | A1 | 5/2010 | Lawyer et al. |
| 2010/0228804 | A1 | 9/2010 | Dasgupta et al. |
| 2010/0274478 | A1 | 10/2010 | Takahashi |
| 2011/0081640 | A1 | 4/2011 | Tseng et al. |
| 2011/0255773 | A1 * | 10/2011 | Takahashi ............... G06T 7/001 382/145 |
| 2013/0144786 | A1 | 6/2013 | Tong et al. |
| 2013/0145441 | A1 | 6/2013 | Mujumdar et al. |
| 2014/0270401 | A1 | 9/2014 | Irwin et al. |
| 2014/0282237 | A1 | 9/2014 | Fuzell-Casey |
| 2015/0074415 | A1 | 3/2015 | Tanner et al. |
| 2015/0154760 | A1 | 6/2015 | Ishiyama et al. |
| 2015/0169638 | A1 | 6/2015 | Jaber et al. |
| 2015/0206304 | A1 | 7/2015 | Pearson Peyton |
| 2015/0269387 | A1 | 9/2015 | Cannarsa |
| 2015/0278224 | A1 | 10/2015 | Jaber et al. |
| 2015/0332109 | A1 | 11/2015 | Anand |
| 2016/0019429 | A1 | 1/2016 | Ishigaki et al. |

FOREIGN PATENT DOCUMENTS

| | | |
|---|---|---|
| CN | 104424426 | 3/2015 |
| WO | 2013185326 A1 | 12/2013 |
| WO | 2014165431 | 10/2014 |
| WO | 2014187118 A1 | 11/2014 |

* cited by examiner

| Mood Entry | Mood Image | Mood Entry | Mood Image |
|---|---|---|---|
| 202 | 204 | 206 | 208 |
| Laugh 210 |  212 | Sad 214 |  216 |
| Smile 218 |  220 | Cry 222 |  224 |

METHOD AND APPARATUS FOR VERIFYING IMAGES BASED ON IMAGE VERIFICATION CODES

CROSS-REFERENCE TO RELATED APPLICATION

This application claims priority to Chinese Patent Application No. 201510124938.9, filed on Mar. 20, 2015, which is incorporated herein by reference in its entirety.

TECHNICAL FIELD

The present disclosure relates generally to the field of network technology and, more particularly, to methods and apparatuses for verifying images based on image verification codes.

BACKGROUND

Some network information is open to all users for publicly posting information, such as product information, books, music, videos, and the like. However, some other network information is not available to share with to all users, called "non-shared information" and includes users' information, business information, financial statements of companies, and the like. This non-shared information needs to be safeguarded from machine attacks that aim to obtain or release this information to the public.

Techniques using image verification codes can avoid the unwanted release of information obtained by machine attacks. However, when using existing techniques, there are situations where verification codes in the images may not be recognizable to users or are not explicitly presented to the users. Therefore, there are instances where a user may need to refresh a verification code multiple times or may input an incorrect verification code due to difficulty recognizing the verification code presented.

SUMMARY OF THE DISCLOSURE

Embodiments of the present disclosure provide a method and apparatus for verifying images based on image verification codes. According to one embodiment of the present disclosure, a method for verifying images based on image verification codes includes selecting an identification image and multiple candidate images from an image gallery. The candidate images include interference images and correct images corresponding to the identification image. The method also includes providing the identification image, the candidate images, and hint information based on relationships between the identification image and the correct images. Additionally, the method includes receiving selection information of images selected from the candidate images. The method also includes determining that verification has been passed if the correct images are determined to be selected according to the selection information or, otherwise, determining that verification has failed.

According to another embodiment of the present disclosure, a device for verifying images based on image verification codes includes an image selecting module used for an selecting identification image and a plurality of candidate images from an image gallery. The plurality of candidate images include interference images and correct images corresponding to the identification image. The device also includes an information providing module used for providing the identification image, the candidate images, and hint information based on relationships between the identification image and the correct images. The device also includes a verifying module used for receiving selection information of images selected from the candidate images and for determining if verification has passed if the correct images are determined to be selected according to the selection information or, otherwise, for determining that verification has failed.

Compared to existing techniques, embodiments of the present disclosure provide identification images, candidate images, and hint information for relationships based on image content between the identification image and correct images to allow the user select images based on the identification image and hint information so that the method or device of the present disclosure can verify whether the verification is passed or failed based on images the user selected from the candidate images. Therefore, methods or devices described in the present disclosure do not require the user to recognize the details of key content, such as letters or numbers in the image, nor does a user need to input such letters or numbers. This helps avoid situations where a user has to refresh a verification code multiple times or inputs an incorrect verification code due to misreading the details of the verification code. The methods or devices of the present disclosure require the user to recognize the general content of the image, and also requires some intellectual analysis from a user regarding the relationships between the images based on the general scope or content of the image. As such, the image verification codes in the present disclosure are not easily cracked by machines. The present disclosure enhances techniques using image verification codes and, at the same time, increases the difficulty of cracking the verification codes and makes the process of verification more intuitive and user-friendly.

BRIEF DESCRIPTIONS OF THE DRAWINGS

Embodiments of the present disclosure will be better understood from a reading of the following detailed description, taken in conjunction with the accompanying figures, in which like reference characters designate like elements and in which.

DETAILED DESCRIPTION

Figure 1:
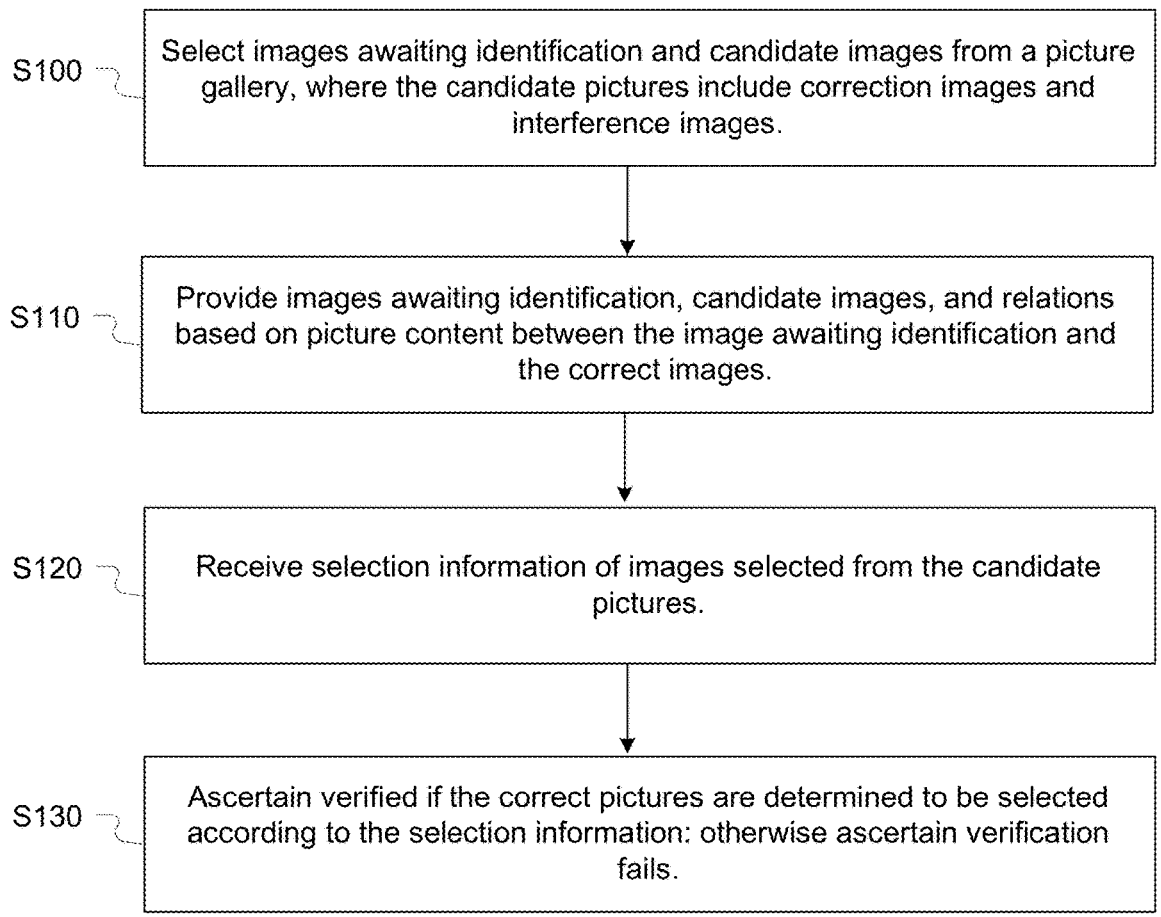
FIG. 1 is a flowchart of an exemplary sequence of computer implemented steps for performing a method for verifying images based on image verification codes according to embodiments of the present disclosure.

Prior to the detailed description of the embodiments of the present disclosure, it should be noted that some embodiments are described as processes or methods according to the flowcharts. Even though the flowcharts describe each of the steps or operations in an orderly sequence, many of the steps or operations can be executed in parallel, concurrently, or simultaneously. Moreover, the order of the steps or operations can be rearranged. Upon completion of the steps and operations, the execution can be terminated; however, there can also be additional steps or operations not included in the figures in applications. The execution can respond to methods, functions, procedures, subroutines and subprograms, and the like.

"Computing devices" referred to in the present disclosure can also be called "computers," which are electronic devices for executing predetermined processes, including numerical computing and/or logic computing and the like, by running predetermined programs or commands. A computer includes one or more processors and memory. The processors execute existence commands stored in the memory to execute the predetermined processes. Alternatively, the computer has hardware including ASIC (application-specific integrated circuit), FPGA (field-programmable gate array), and DSP (digital signal processor) execute the predetermined processes or has the combination of the processors and the hardware execute the predetermined processes. The computing devices include, but are not limited to, servers, personal computers, laptops, tablet computers, smartphones, and the like.

The computing devices include client devices and network devices. The client devices include, but are not limited to, computers, smartphones, PDAs (personal digital assistant), the like; the network devices include, but are not limited to, a single network server, a set of services constituted by multiple network servers, or a cloud. A cloud is constituted by a large number of computers or network servers based on cloud computing, where cloud computing is a type of distributed computing, which is a virtual supercomputer constituted by a large number of loosely coupled computers. The computing devices can embody the present disclosure solely or connect to network to interact with other computing devices in the network to embody the present disclosure. The network where the computer devices are located includes, but is not limited to, internet, wide area network, metropolitan area network, local area network, virtual private network, and the like.

It should be mentioned that the client devices, the network devices, and the network are just examples; other computing devices or networks that exist or may exist in the future, if applicable to the present disclosure, should be included as references within the scope of the present disclosure.

The methods are to be discussed below, some of which are presented in the form of flowcharts that can be embodied in the forms of hardware, software, firmware, middleware, microcode and hardware description language, or the combinations of any of these. When the methods are embodied in the forms of software, firmware, middleware, or microcode, the program codes or code segments used for executing essential missions can be stored in machines or computer-readable mediums such as storage mediums. One or multiple processors can be used to execute essential tasks.

The specific structures and function details that are designed to describe the embodiments of the present disclosure are just exemplary. The present disclosure can be embodied in multiple ways, which are not designated to be limited to the embodiments described herein.

It should also be noted that, in certain embodiments, the functions/operations can be embodied in different orders from the ones described in the flowcharts. For example, two figures appearing in succession, based on the related functions/operations, can actually be embodied at substantially the same time or can be embodied in an opposite order to the one described in the figures.

According to some embodiments of the present disclosure, a method for verifying images based on image verification codes is mainly performed using computer devices, where the computer devices include, but are not limited to, personal computers, servers, and the like.

FIG. 1 is an exemplary flowchart depicting a sequence of computer implemented steps for executing a method for verifying images based on image verification codes according to embodiments of the present invention. In step S100, identification images and candidate images are selected from an image gallery. The candidate images include correction images and interference images.

In particular, the images mentioned in the present disclosure may include images and images with animation effects, such as an image of a blinking smiling face or an image of a repeatedly jumping animal. The image gallery comprises multiple images, and the images may comprise joint photographic expert groups (better known as JPEGs) or tagged image files (better known as a TIFs). The format of the images in the image gallery can be the same or different. There is no limitation on the formats of the images in the image gallery.

Usually one image is selected from the image gallery as the identification image, one image is selected from the image gallery as the correct image, and multiple images are selected from the image gallery as interference images. There are other possibilities which will be discussed hereinafter. Several exemplary situations are described below:

Exemplary Situation 1: One image is selected from the image gallery as the identification image, one image is selected from the image gallery as the correct image, and one image is selected from the set of image as the interference image.

Exemplary Situation 2: One image is selected from the image gallery as the identification image, multiple images are selected from the image gallery as the correct images, and multiple images are selected from the set of images as the interference images.

Exemplary Situation 3: Multiple images, such as two images, are selected from the image gallery as the identification images, one image is selected from the image gallery as the correct image, and multiple images are selected from the set of image as the interference images.

Exemplary Situation 4: Multiple images (e.g., two images), are selected from the image gallery as the identification images, multiple images are selected from the image gallery as the correct images, and multiple images are selected from the image gallery as the interference images.

The descriptions that follows is mostly based on Exemplary Situation 1, where one image is selected from the image gallery as the identification image, one image is selected from the image gallery as the correct image, and one image is selected from the set of images as the interference image. However, the following description can also be extended to cover situations where multiple images, such as two images, are selected from the image gallery as the identification images, multiple images are selected from the image gallery as the correct images, and one image is selected from the image gallery as the interference image.

According to some embodiments, selecting an identification image and candidate images from an image gallery may include presetting a set of hint information, including multiple pieces of hint information, where each piece of hint information represents a relationship between two images based on image content; the relationship can based on the two images having identical content or having different content. The set of hint information includes some hint information indicating identical content and some hint information indicating different image content. When one or multiple images (usually one image) have been selected from the image gallery as the identification images, a piece of hint information is selected (e.g., randomly selected or selected using a certain range of the set of hint information), one or multiple satisfactory images (usually one image) will be selected according to the selected identification image and the relationship of image content between the two images described in the hint information. This relationship will be used to identify the correct images, and one or more unsatisfactory images (usually multiple images) will be selected that do not match the relationship.

According to some embodiments, selecting an identification image and candidate images from an image gallery may also include presetting a set of hint information, including multiple pieces of hint information where each piece of hint information represents a relationship based on the image content of two images. The relationship can be based on the fact that the two images have identical content or different content. The set of hint information includes hint information indicating that the images have identical content or different content. When a piece of hint information has been selected from the set of hint information, (e.g., randomly selected or selected using a certain range), an identification image, a correct image, and interference images will be selected from the image gallery according to the selected hint information. The relationship of the image content between the identification image and the correct image should match the relationship described in the selected hint information, and the relationships of the image content between the identification image and the interference images should not match the relationship described in the selected hint information.

According to some embodiments, selecting an identification image and candidate images from an image gallery may also include selecting one or more images (usually one) from the image gallery as the identification images and one or more images (usually one) as the correct images. Corresponding hint information is identified or selecting based on the relationship of the image content of the selected identification image and the selected correct image. One or multiple (usually multiple) images are selected based on the identification image and the identified hint information as interference images, where the relationship of the image content of the selected identification image and the image content of the selected interference images does not match the relationship described in the identified hint information. When selecting hint information, the method may include selecting the hint information based on a preset set of hint information, such as selecting one piece of hint information that appropriately describes the relationship between image content of the identification image and image content of the correct image. The method may also determine the relationship between image content of the identification image and image content of the correct image according to a preset rule. There is no limitation on determining the hint information. For example, the hint information can be hint information describing either the image content of the images or the text content of the images.

In order to manage the images in the image gallery more conveniently and to accurately select the correct images and the candidate images, the images may be sorted in the image gallery into multiple subsets, where each of the subsets includes one or more images.

According to some embodiments, the images are sorted according to their content types into related image subsets. Each of the image subsets corresponds to a content type, and all of the images in that image subset have that same content type. In some situations, different image subsets correspond to different content types. Different image subsets may correspond to the same content type, such as when the number of images of a certain content type in a certain image subset exceeds the capacity of that image subset. In this case, all of the images under that content type can be placed into two or more image subsets.

The images correspond to a piece of information describing the content of the image, and can also be referred to as identification information of the image content. For example, there are several images in instant messaging applications and in input libraries where each image corresponds to an entry. According to some embodiments, the entries are collected together with the collection of the images from the instant messaging applications and the input libraries, where each of the entries corresponding to one of the collected images, which can also be referred to as the descriptive information of the image content. The images are usually sorted, according to their content types, into corresponding image subsets. The content type of images generally indicates and/or summarizes the descriptive information of the image content corresponding to each of the images.

Embodiments of the present invention may be implemented in such a way that each of the images in the image gallery correspond to a piece of descriptive information regarding image content, each piece of the descriptive information regarding image content corresponds to only one image subset, and different image subsets correspond to different image content types. In some cases, one image may correspond to multiple image subsets. For example, when one image corresponds to multiple pieces of descriptive image content information, according to some embodiments, the image corresponding to multiple pieces of descriptive image content information can be either sorted into one of the corresponding image subsets or sorted into multiple corresponding image subsets. In another specific example, when one piece of descriptive information of an image corresponds to multiple image subsets, according to some embodiments, that image can be sorted into one of the corresponding image subsets or sorted into several of these image subsets.

According to some embodiments, when the image subsets are set, selecting an identification image from the image gallery can include randomly selecting an image subset, selecting an identification image from that image set can include randomly selecting an image from that image subset as the identification image, selecting a piece of hint information can include randomly selecting a piece of hint information, and determining the image content types of the two selected images may be performed according to the piece of hint information and the image content type of the selected image subset. The relationship of image content between one of the two image content types associated with the correct image, and the image content type of the image subset associated with the identification image may be determined to satisfy the hint information. The relationship of image content between the other one of the two image content types, which is associated with the interference image, and the image content type of the image subset associated with the image awaiting may be determined to not satisfy the hint information.

The process may further include selecting correct images from the image subset associated with the image content type, where the relationship with the image subset associated with the identification image satisfies the hint information. The correct images may be selected randomly from the image subset, and an interference associated with the other image content type may be randomly selecting from the image subset.

According to some embodiments, when the image subsets are set, the process of selecting an identification image from the image gallery can include selecting two image subsets. The two image subsets may be randomly selected. The process may further include selecting identification images and correct images from one of the two image subsets. The two images may be randomly selected from the image subset, where one of the images is set as the identification image, and the other image is set as the correct image. Interference images may be selected from the other image subset. The appropriate hint information for this circumstance may be "image types that are similar." The user is expected to select an image from the image subset.

According to some embodiments, when the image subsets are set, the process of selecting an identification image from the image gallery can include selecting two image subsets (e.g., randomly selecting two image subsets), selecting identification images, selecting several interference images from one of the two image subsets (e.g., randomly selecting four images from the image subset), where one of them is set as the identification image and the other three are set as the interference images, and then selecting correct images from the other image subset. The appropriate hint information for this circumstance can be "image types are different." The user is expected to select an image from the other image subset.

According to some embodiments, when the image subsets are set, the process of selecting an identification image from the image gallery can include selecting three image subsets, selecting identification images from a first selected image subsets, selecting correct images from a second selected image subset, and selecting interference images from a third selected image subset. A piece of hint information is selected from a set of hint information, where the hint information describes a relationship between the image content of the identification image and the image content of the correct image. The relationship of the image content of the identification image and image content of the interference image does not satisfy the hint information. The relationship can be determined based on the image content of the identification image and the image content of the correct image according to a preset rule. Other methods and techniques may be used to determine hint information.

In step S110, identification images, candidate images, and relationships between image content of identification images and image content of correct images are provided. The identification images, candidate images, and hint information can be provided to a terminal device by pushing notifications to the terminal device, such as a notifications based on HTTP. Furthermore, images selected from the identification images and the candidate images can be transformed and then sent to the terminal device.

In one example, only identification images are transformed, and the transformed identification images, the candidate images (not transformed), and the hint information are provided to the terminal device.

In another example, the images of all of the candidate images are transformed, and the identification image (not transformed), the transformed candidate images, and the hint information are provided to the terminal device.

In another example, the images of the identification images and all of the candidate images are transformed, and the transformed identification images, the transformed candidate images, and the hint information are provided to the terminal device.

The image transformations performed on the images described above can include adding watermarks to images, adding shading to images, blurring the image, making the image transparent, etc. Existing processing algorithms can be used to transform the images. It should be noted that embodiments of the present invention do not limit the specific methods of transforming the images.

In step S120, selection information for images selected from candidate images is received. The selection information may include information transmitted from the terminal device. For example, the terminal device receives the identification images, the candidate images, and the hint information regarding the relationships between image content of the identification images and the image content of the correct images from a network side transmission. The identification images, the candidate images, and the hint information will be presented to the user. The user can then select an image, by clicking a mouse or using a touch pad, for example, from the candidate images presented at the terminal device. The user-selected image is the image which the user thinks satisfies the relationship described in the hint information. The user-selected image can be moved to a selection column or highlighted at its original location, for example. Selection information will be produced by the terminal device according to the user's selection, then sent to the network side. The selection information can be the specific image the user selected or identification information, such as an image number of the specific image the user selected.

The user can select multiple images from the candidate images presented at the terminal device by clicking a mouse or using a touch pad, for example. The multiple selected images are considered to be the images which the user thinks satisfy the relationship described in the hint information. When the user is allowed to select multiple images as the correct images, the multiple selected images can be moved to a selection column or featured (e.g., highlighted) at their original locations. When the user is not allowed to select multiple images as the correct images, only the last image selected by the user is moved to the selection column or highlighted at its original location. When the user is allowed to select multiple images as the correct images, the selection information can be based on the multiple selected images. For example, the selection information may include the multiple images or the identification information of the images (e.g., image numbers).

In step S130, the verification is passed (e.g., authenticated) when the correct images are determined to be selected based on the selection information. When the correct images are not determined to be selected based on the selection information otherwise, the verification has not been passed (e.g., failed or unauthorized). The verification may be considered to be passed when substantially all of the images that the user selected from the candidate images match the correct images. When substantially all of the images that the user selected from the candidate images do not match the correct images, the verification is considered failed. According to some embodiments, the verification may be considered passed even if not all of the images which the user selected from the candidate images match the correct images. Other exemplary verification scenarios (e.g., passed or failed) are described below based on selection information described hereinafter.

A first specific example: when the number of correct images is one, and the a user is not allowed to select multiple images, if the selection information received shows that the image selected by the user is one of the correct images, the verification is passed; otherwise, the verification fails.

A second specific example: when the number of correct images is one and the embodiment allows a user to select multiple images, such as two images, if the selection information received shows that multiple images selected by the user include one of the correct images, the verification is passed; otherwise, the verification fails A third specific example: regardless of the number of correct images, and regardless of whether a user is allowed to select multiple images, if the selection information received shows that the one or more images selected by the user include one of the correct images, and no interference images are included in the selected images, the verification is passed; otherwise, the verification fails.

Determining if the verification has passed or failed according to the selection information and the correct images is not limited to any specific implementation. According to some embodiments, determining if the verification has passed or failed is based on well-known verification algorithms, for example.

Figure 2:
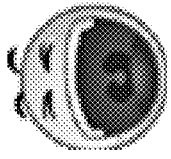
FIG. 2 is a diagram of exemplary mood images according to embodiments of the present disclosure.
Figure 2:
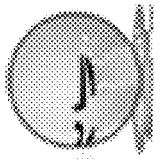
Figure 2:
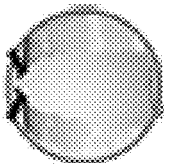
Figure 2:
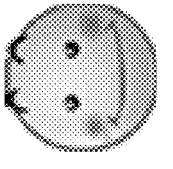

With regard to FIG. 2, a block diagram of exemplary mood images for verifying images based on image verification codes is depicted according to embodiments of the present invention. The mood images described herein are images having content that explicitly describes or expresses a certain mood (e.g., happy, angry, sad, etc.)

The mood images are sorted according to their image content into corresponding image subsets. Mood images and corresponding mood entries can be collected from instant messaging applications such as "Baidu Hi," "QQ," "WeChat," and the like and input libraries such as "Baidu Keyboard," "Sougou Keyboard," "QQ Keyboard," and the like. The mood entries of the mood images can describe the image content of the corresponding mood image. For example, exemplary mood images and corresponding mood entries collected from an instant messaging application are displayed in FIG. 2. There are four mood images under header Mood Image 204 and 208. Each mood image corresponds to a mood entry under Mood Entry header 202 and 206. Mood image 212 corresponds to mood entry laugh 210, mood image 216 corresponds to mood entry sad 214, mood image 220 corresponds to mood entry smile 218, and mood image 224 corresponds to mood entry cry 222, for example.

According to some embodiments, the mood image gallery includes two image subsets: one image subset has images with content type "happy," which can be referred to as image subset happy, and the other image subset has images with content type "unhappy," which can be referred to as image subset unhappy. Mood images can be sorted into the image subset happy or the image subset unhappy according to their mood entries. Image subset happy includes mood images having content such as smile, laugh, snicker, simper, smirk, clapping, a sun smile, and the like; image subset unhappy includes mood images having content such as cry, sad, weep, and the like. There are no intersections between the image subset happy and the image subset unhappy, which means that the mood images belongs exclusively to one image subset.

The moods expressed by the mood images in the image subset happy are similar to each other, and the moods expressed by the mood images in the image subset unhappy are also similar to each other. However, the moods expressed by the mood images in the image subset happy are unlike (e.g., the opposite of) the moods expressed by the image subset unhappy.

Next, hint information is selected from a set of hint information. According to some embodiments, two pieces of hint information are selected from the set of hint information: one piece of hint information describes similar moods and the other piece of hint information describes opposite moods. When the number of the identification images is one, and the number of the correct images is three, if the hint information selected from the set of hint information describes similar moods, then two mood images can be selected from one of the image subsets, where one of the two mood images is set as the identification image, and the other mood image is set as the correct image. Two mood images can be selected from another image subset having mood images with moods opposite of the interference images. If the hint information selected from the set of hint information describes opposite moods, then three mood images can be selected from one of the image subsets where one of the three mood images is set as the identification image and the other two mood images are set as the interference images. One mood image can be selected from another image subset having mood images with moods opposite of the correct image.

Next, the identification images and at least one of the mood images selected from the candidate images are transformed, where the transformation includes adding shading to the images or blurring the images. These transformations usually do prevent the user from recognizing the images.

Next, the identification images (e.g., the transformed identification images or the identification images prior to transformation), the candidate images (e.g., transformed candidate images or the candidate images prior to transformation), and the hint information are provided. For example, a notification including the transformed identification images, the transformed candidate images, and the hint information can be sent to the terminal device. The order of the candidate images during presentation to the user will be set randomly to avoid the correct images being fixed at a certain position.

Figure 3:
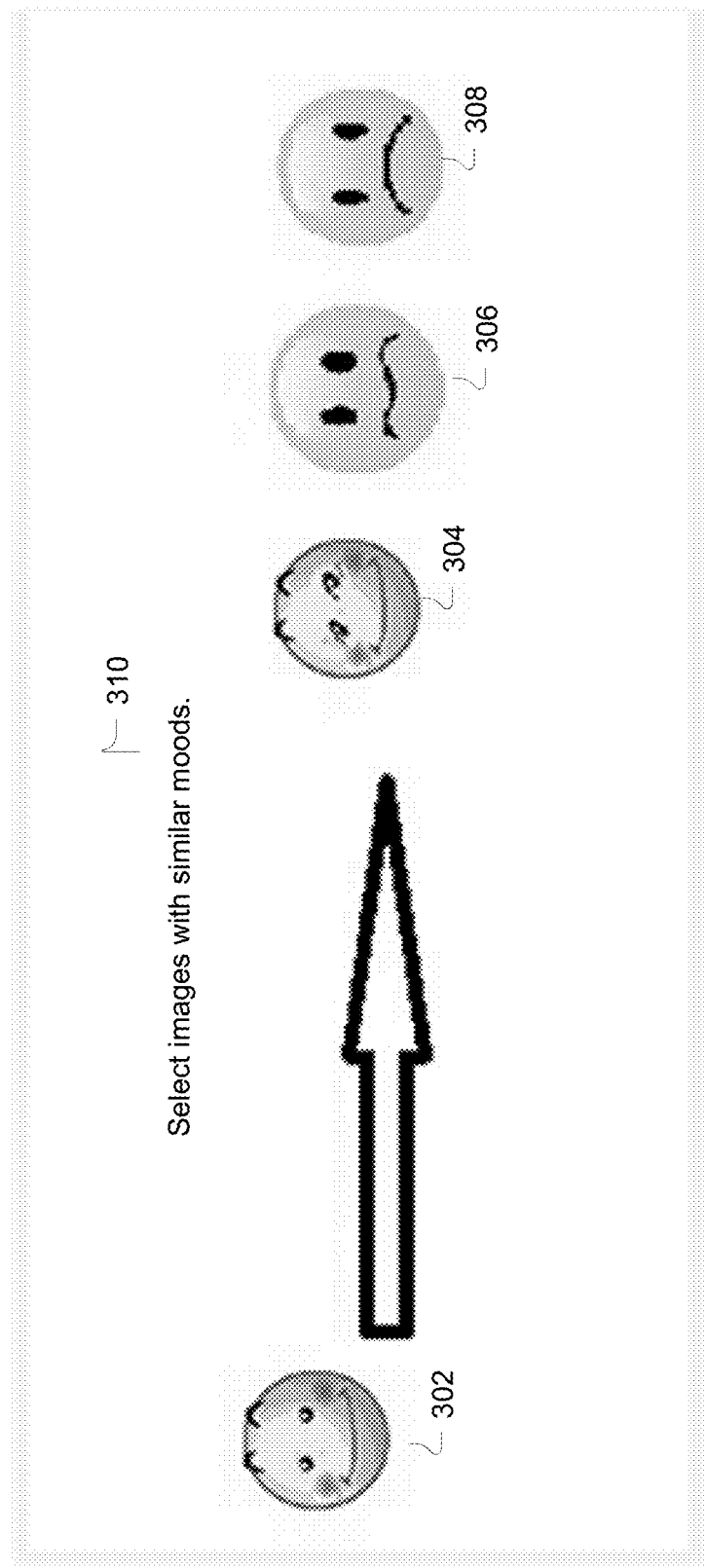
FIG. 3 is a diagram of an exemplary identification image, candidate images, and hint information instructing a user to select images with similar moods according to an embodiment of the present disclosure.

In FIG. 3, an image 302 awaiting identification is a smile image from the image subset happy, the hint information 310 is "select images with similar moods," the correct image is image 304, the interference images are image 306 and 308. The identification image (image 302), the correct image (image 304), and the interference images (image 306 and 308) are blurred.

Figure 4:
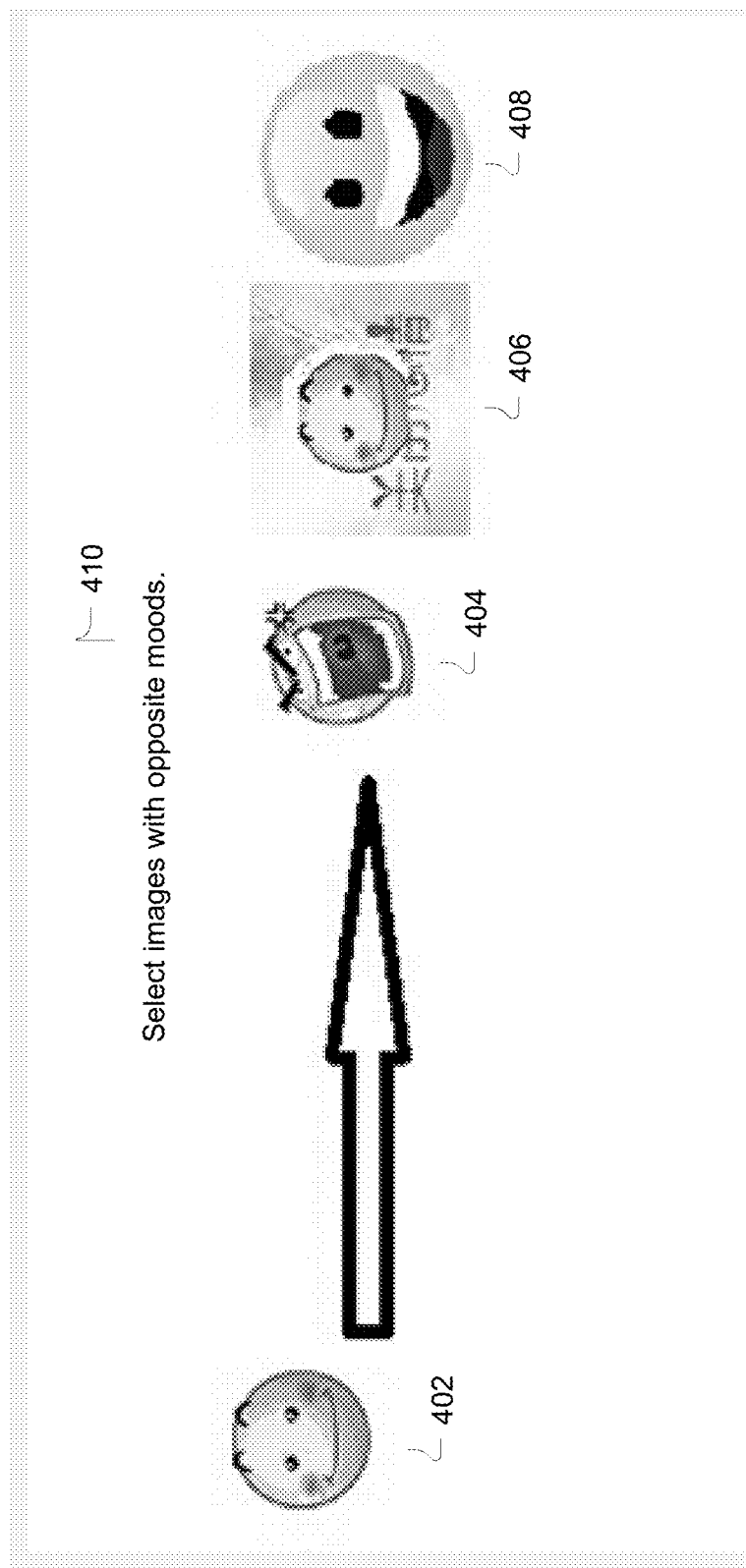
FIG. 4 is a diagram of an exemplary identification image, candidate images, and hint information instructing a user to select images with opposite moods according to an embodiment of the present disclosure.

In FIG. 4, an image 402 awaiting identification is a smile image in the image subset happy, the hint information 410 is "select images with opposite moods," the correct image is image 404, the interference images are image 406 and 408. The correct image (image 404) and the interference images (images 406 and 408) are blurred and shading is added to image 404.

Figure 5:
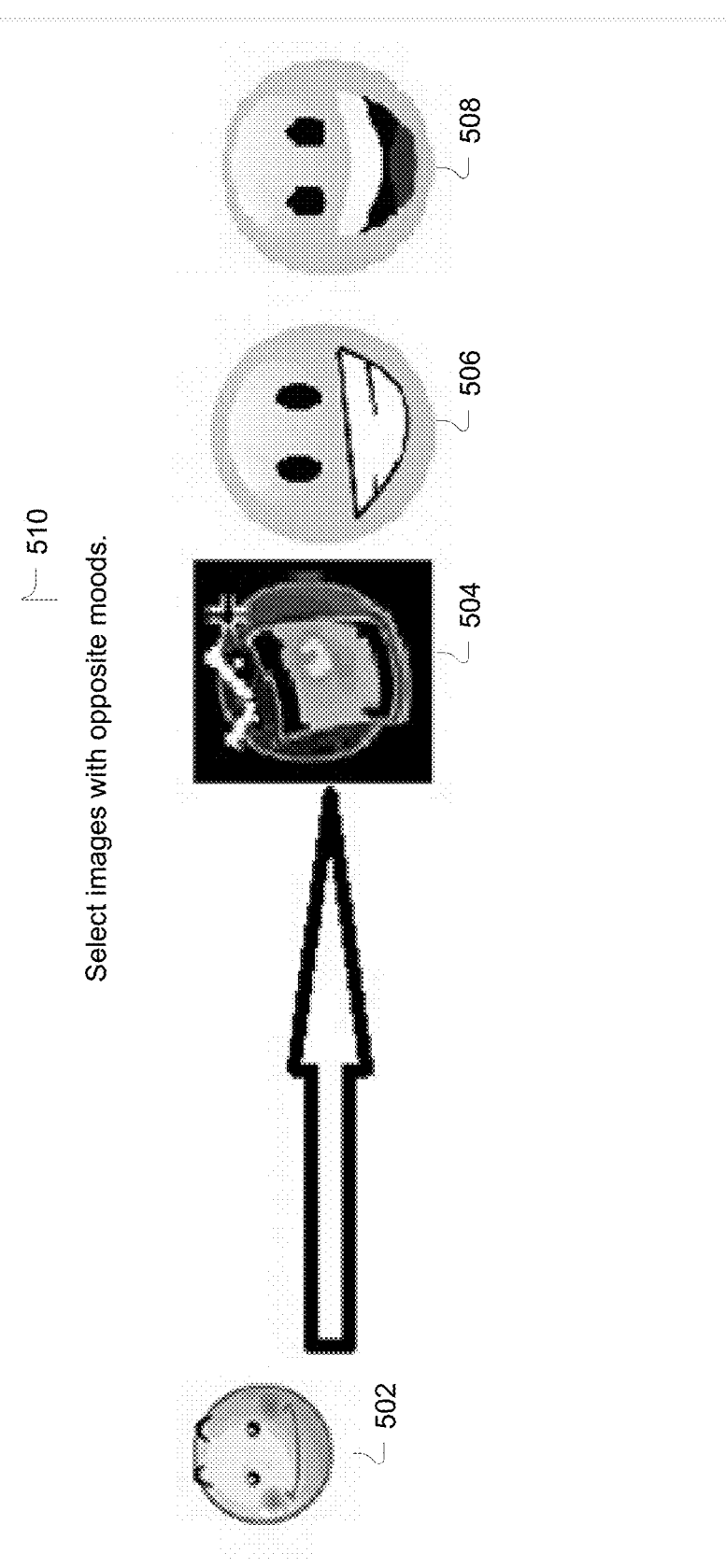
FIG. 5 is a diagram of an exemplary identification image, candidate images, and hint information instructing a user to select images with opposite moods, where a candidate image has been transformed according to an embodiment of the present disclosure.

In FIG. 5, the image 502 awaiting identification is a smile image in the image subset happy, the hint information 510 is "select image with opposite moods," the correct image is image 504, the interference images are image 506 and 508. The identification image (image 502), the correct image (image 504), and the interference images (images 506 and 508) are blurred and the color of image 504 is inverted.

Finally, when the selection information of the image selected from the candidate images is received, it is determined if the image selected from the candidate images is the correct image based on the selection information. If it is the correct image, the verification is passed; if it is not the correct image, the verification fails.

In one exemplary embodiment, the number of identification images is one, the number of the correct images is one, and the number of the candidate images is three, where the number of identification images, the number of correct images, and the number of candidate images are adjustable. The transformation can be performed on the identification image, or on the correct image, or on all of the candidate images. The mood image gallery includes two image subsets, and the set of hint information includes two types of hint information. However, the numbers of image subsets and types of information can be greater. Methods of selecting identification images, selecting the candidate images, and selecting the hint information can be more complicated. For example, image content included in the image subsets can be more advanced, such as animated or waving images, and the relationships based on image content described in the hint information can be more complicate.

Most users are familiar with the instant messaging applications and input libraries, as well as the mood images incorporated therein. The mood images usually use well-known images or expressions for describing a certain mood; therefore, users can easily identify the mood image and the described meaning or emotion without a detailed study or review of the mood images. The users can use a mouse or touch pad to select target images, for example. The verification is determined to be passed when the user correctly identifies the identification images, the hint information, and the candidate images, which increases the difficulty for a machine to crack the verification code. Using mood images to perform the verification based on the image verification codes is a novel method that enhances verification code techniques.

Figure 6:
FIG. 6 is a diagram of an exemplary animal image according to embodiments of the present disclosure.
Figure 7:
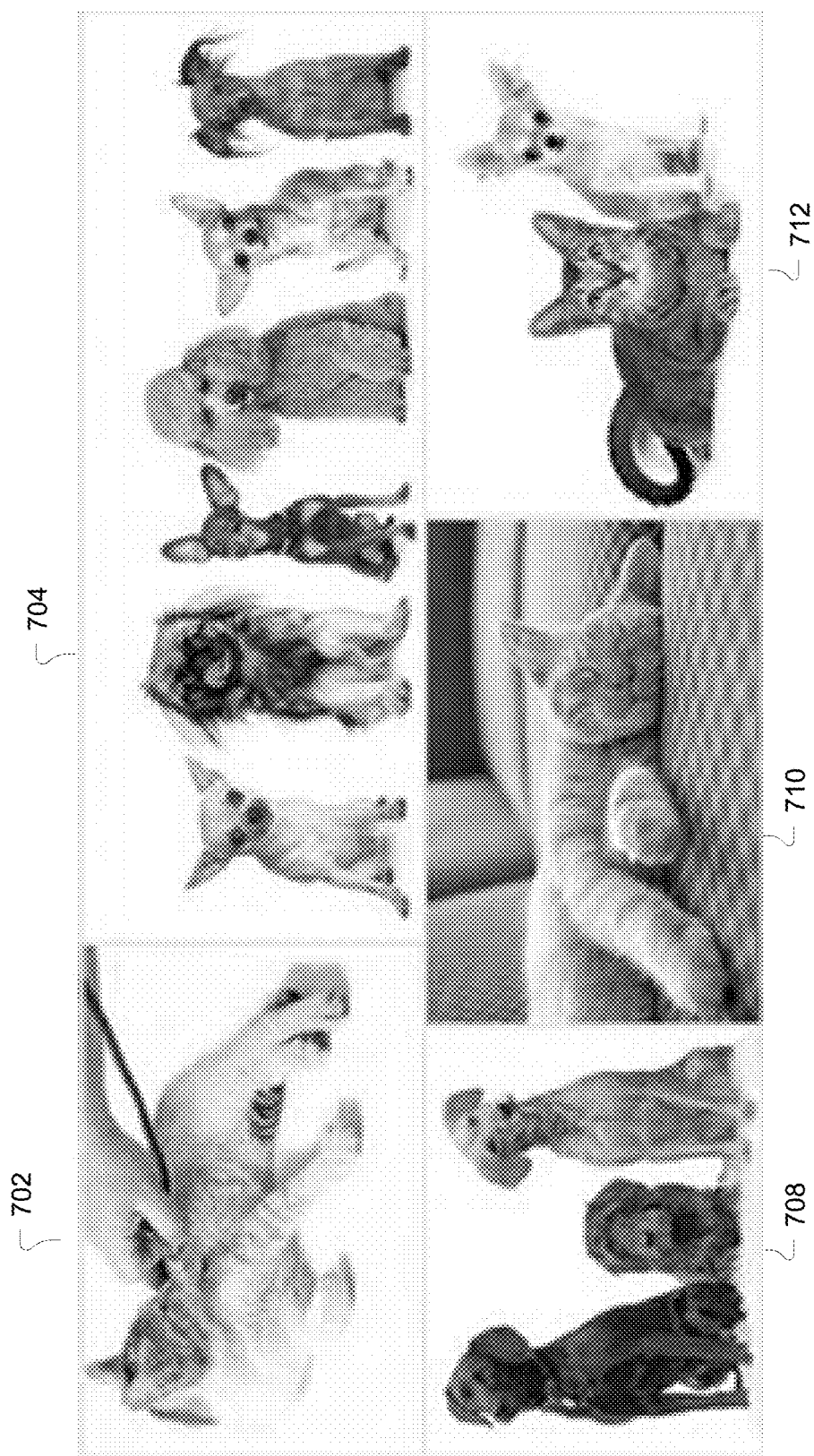
FIG. 7 is a diagram of an exemplary animal image according to embodiments of the present disclosure.

An alternative embodiment describes a method for verifying images based on image verification codes. The embodiment uses animal images to embody the verification. First, the collected animal images are sorted according to their image content into corresponding image subsets. In the embodiment, animal images and corresponding animal entries can be collected from animal web sites or "Baidu Images," and the animal entries of the animal images can better describe the image content of the corresponding animal image. For example, exemplary animal images and corresponding animal entries collected from an exemplary animal website are displayed in FIG. 6 and FIG. 7. In FIG. 6, the animal entry defined by the animal image is a cat (602). There are five images in FIG. 7, each one of the animal images corresponds to a respective animal entry. The animal entries which these five animal images correspond to are a sick cat (702), six dogs (704), three dogs (708), a sleeping cat (710), and a cat with a dog (712).

According to some embodiments, the animal image gallery includes two image subsets; one subset has images with the content type "cat," which can be referred to as image subset cat, and the other subset has images with content type "dog," which can be referred to as image subset dog. The animal images are collected and sorted into either image subset (cat or dog) according to their corresponding animal entries. The last image in FIG. 7 (712) can be omitted because it includes both cats and dogs.

Any two of the images in the image subset cat should be the same type of animal image, and any two of the images in the image subset dog should be the same type of animal image. However, the animals demonstrated by the animal images in the image subset cat and the image subset dog should be different types of animal images.

Next, a piece of hint information is selected from a set of hint information. For example, there may be two pieces of hint information in the set of hint information; one piece of hint information describes one type of animal, and the other piece of hint information describes two or more different types of animals. When the number of the identification images is one, and the number of the correct images is three, if the hint information selected from the set of hint information describes the same type of animal, then two animal images can be selected from one of the image subsets, where one of the two animal images will be set as the identification image. The other animal image will be set as the correct image, and two animal images can be selected from another image subset to be used as the interference images. If the hint information selected from the set of hint information describes different animals, then three animal images can be selected from one of the image subsets, where one of the three animal images will be set as the identification image, the other two animal images will be set as the interference images. One animal image can be selected from another image subset as the correct image.

Next, the images to be used as the identification images and at least one of the animal images selected from the candidate images are transformed, for example, by adding shading to the images or blurring the images. The transformations described in the embodiment usually do not have an adverse effect on the user's ability to identify the images.

Next, the identification images identification images (e.g., the transformed images or the selected images that have not yet been transformed), the candidate images (before or after transformation), and the hint information described above are provided. For example, a notification including the transformed identification images, the selected candidate images, and the hint information can be sent to the terminal device for presentation to the user. The order of the candidate images during demonstration is set randomly to avoid the correct images being predictably fixed at a certain spot in the candidate images.

Finally, when the selection information of the image selected from the candidate images is received, the selection information is used to determine if the user selected the correct image (e.g., the identification image) from the candidate images. If the selected image is determined to be the correct image, the verification is has been passed. If the selected image is determined not to be the correct image, the verification has failed.

According to some embodiments, the number of the identification images is set as one, the number of the correct images is set as one, and the number of the candidate images is set as three, where the number of the identification image, the number of correct images, and the number of candidate images are adjustable. Moreover, image transformations can be performed only on the identification image or the correct image, or to all of the candidate images. For example, the animal image gallery includes two image subsets and the set of hint information includes two types of hint information. However, the number of the image subsets and types of information can be greater; methods of selecting identification images, the candidate images, and the hint information can be more complicated than described; there can be more image content included in the image subsets, such as waving images; and the relationships based on image content described in the hint information can be more complicated.

Most users are familiar with common animals, and the animal images usually use the scope or context of the content of the images for describing a certain animal; therefore, the users usually can easily identify the animal image and the meaning described by the image content without paying attention to the details of the animal images. The users can use mice or touch pads to select target images, which is a convenient operation and a simple interaction between people and machines. According to some embodiments, the verification is determined to be passed when the user correctly identifies the image or identification images, the hint information, and the candidate images, which increases the difficulty for a machine to crack the verification code. Using image verification codes based on animal images is a novel method that enhances verification code techniques.

It should be noted that the present disclosure can use an emotion image gallery to embody the method for verifying images based on image verification codes. The emotion images and the image subsets included in the emotion image gallery can be set based on the Hevner adjective ring, for example. There are usually multiple adjectives included in the Hevner adjective ring, such as sixty-seven adjectives, with all of the adjectives sorted into multiple types, such as eight types; all of the types form a ring according to the relationships among the adjectives, where the ring have a progressive relationship with adjacent rings (e.g., more or less emotional intensity). The specific methods for verifying images based on image verification codes are similar to the embodiments above, which are not discussed in detail herein.

An alternative embodiment describes a device for verifying images based on image verification codes.

Figure 8:
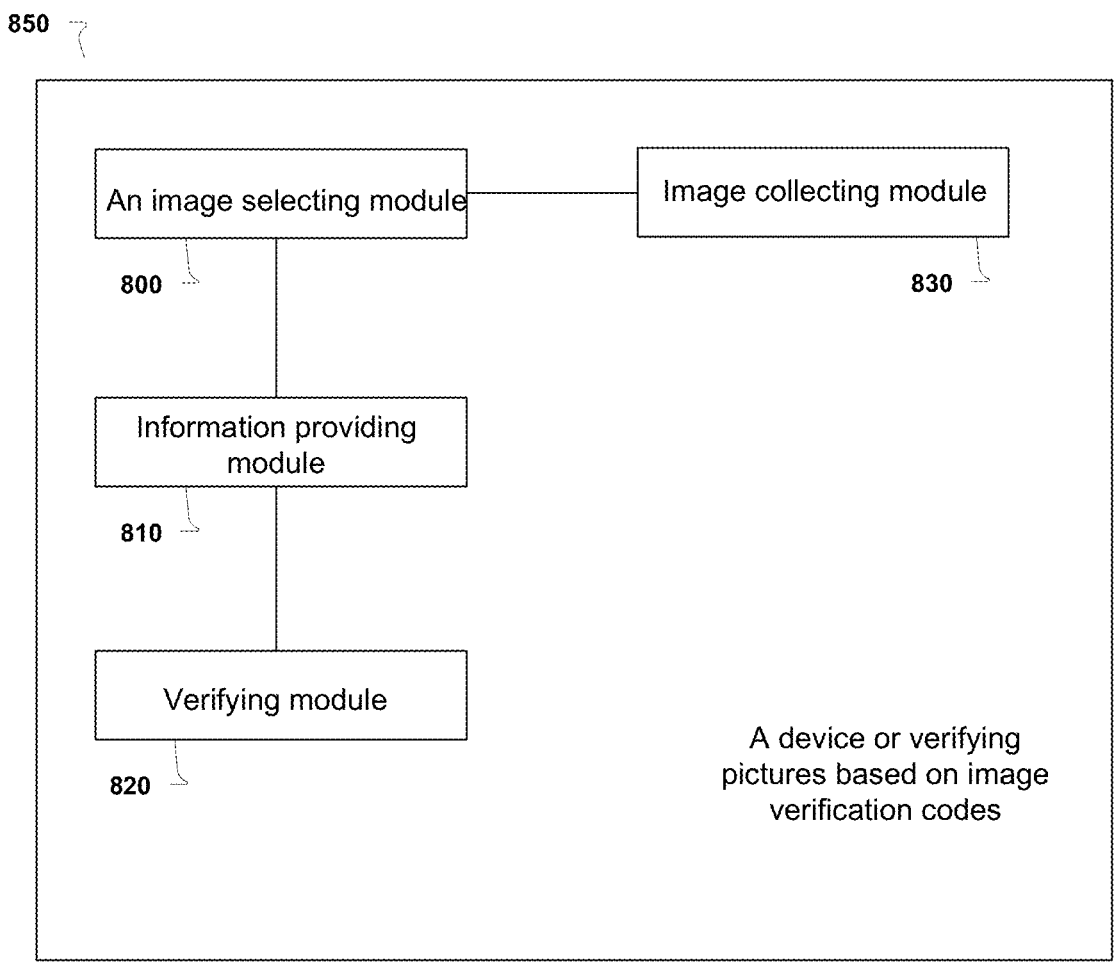
FIG. 8 is a block diagram of an exemplary device for verifying images based on image verification codes according to embodiments of the present disclosure.

With regard to FIG. 8, a block diagram of an exemplary device for verifying images based on image verification codes is depicted according to embodiments of the present disclosure. The exemplary device described in FIG. 8 includes image selecting module 800, information providing module 810, and verifying module 820. Furthermore, the device can further include image collecting module 830.

Image selecting module 800 is mainly used for selecting identification images and candidate images from an image gallery. In particular, the candidate images include interference images and correct images corresponding to the identification images. The image gallery is an umbrella name for multiple images gathered together; the image gallery usually includes a large number of images. The image format of each of the images can be joint photographic expert groups (often known as a JPEG) or tagged image file (better known as a TIF), and the formats of all of the images in the image gallery can be either the same, or different; there is no limitation on the formats of the images in the image gallery.

Usually one image is selected from the image gallery by image selecting module 800 as the identification image, one image is selected from the image gallery as the correct image, and multiple images are selected from the image gallery as the interference images. Certainly, there are other possibilities in selecting certain numbers of images, which will be discussed hereinafter.

Exemplary Situation 1: One image is selected from the image gallery by image selecting module 800 as the identification image, one image is selected from the image gallery as the correct image, and one image is selected from the set of images as the interference image.

Exemplary Situation 2: One image is selected from the image gallery by image selecting module 800 as the identification image, multiple images are selected from the image gallery as the correct images, and multiple images are selected from the set of images as the interference images.

Exemplary Situation 3: Multiple images, such as two images, are selected from the image gallery by image selecting module 800 as the identification images, one image is selected from the image gallery as the correct image, and multiple images are selected from the set of images as the interference images.

Exemplary Situation 4: Multiple images, such as two images, are selected from the image gallery by image selecting module 800 as the identification images, multiple images are selected from the image gallery as the correct images, and multiple images are selected from the set of images as the interference images.

The descriptions described hereinafter mostly use Situation 1 to demonstrate the embodiments of the present disclosure where one image is selected from the image gallery as the identification image, one image is selected from the image gallery as the correct image, and one image is selected from the set of images as the interference image. However, the descriptions can be extended to cover the situations where multiple images, such as two images, are selected from the image gallery as the identification images, multiple images are selected from the image gallery as the correct images, and one image is selected from the set of images as the interference image. The descriptions of this embodiment do not include the extended examples.

According to some embodiments, selecting an identification image and candidate images from an image gallery using image selecting module 800 can include presetting a set of hint information in image selecting module 800, where there are multiple pieces of hint information included and each piece of hint information represents a relationship based on image content between two respective images. For example, the relationship can be either that the two images have identical content or different content. The set of hint information includes corresponding hint information indicating identical content and different content of the images. One or multiple images (usually one image) are then selected from the image gallery by image selecting module 800 to be the identification images. Once one piece of hint information is selected, such as randomly selected or selected from a range a hint information, and one or multiple satisfactory images (usually one image) are selected by image selecting module 800 that satisfy the relationship described in the selected hint information. One or multiple unsatisfactory images (usually multiple images) are selected according to the identification image and the relationship described in the same hint information as the interference images.

According to some embodiments, image selecting module 800 selects an identification image and candidate images from an image gallery, and also preselects a set of hint information in image selecting module 800, where there are multiple pieces of hint information included and each piece of hint information represents a relationship based on image content between two respective images. For example, the relationship can be either that the two images have identical content or different content. The set of corresponding hint information includes hint information indicating identical content and different content of the images. A piece of hint information is then selected from the set of hint information by image selecting module 800, such as randomly selected or selected from a certain range, and an identification image, a correct image, and interference images are selected from the image gallery by image selecting module 800 based on the selected hint information. The relationship between the image content of the identification image and the correct image matches the relationship described in the selected hint information, and the relationships of the image content of the identification image and the interference images does not match the relationship described in the selected hint information.

According to some embodiments, image selecting module 800 selects an identification image and candidate images from an image gallery and also selects one or more images (usually one) from the image gallery as the identification images and one or more images (usually one) as the correct images. Corresponding hint information based on the relationship between the image content of the selected identification image and the selected correct image is ascertained or determined, and one or multiple (usually multiple) images are selected by image selecting module 800 as interference images based on the identification image and the determined hint information. The relationships of image content between the selected identification image and the selected interference images does not match the relationship described in the determined hint information. When selecting module 800 determines hint information, the hint information may be based on a preset set of hint information, such as selecting one piece of hint information that appropriately describes the relationship based on image content between the selected identification image and the selected correct image. Image selecting module 800 can also determine the relationship of image content between the identification image and the correct image according to a preset rule of determining relationships based on image content. There is no limitation on image selecting module 800 when determining the hint information during the process of.

The hint information can be hint information describing a format of the images or a format of the texts (e.g., font) of the images, for example.

In order to manage the images in the image gallery more conveniently and to accurately select the correct images and the candidate images, image selecting module 800 sorts the images in the image gallery into multiple subsets, where each of the image subsets includes multiple images. Only one image is located in an image subset according to some embodiments.

Image collecting module 830 is used for collecting mood images and corresponding mood entries. The mood images with mood entries belonging to the same image content type are sorted into a same image subset and all of the mood images are sorted into multiple image subsets, respectively. In particular, the images collected by image collecting module 830 include both still images and images with animation effects, such as a blinking smile image or a repeatedly jumping animal. Image collecting module 830 usually sorts the images according to content types (based on image content) into corresponding image subsets. That is, each of the image subsets corresponds to a content type and all of the images in that image subset have the same content type. In some situations, different image subsets correspond to different content types. In some cases there may be image subsets corresponding to the same content type; for example, when the number of images of a certain content type in a certain image subset exceeds the capacity of that image subset, all of the images under that content type can be placed into two or more image subsets.

Each of the images correspond to a piece of information describing the content of the image. This piece of information can be referred to as identification information of image content. For example, there are images in instant messaging applications and in input libraries where each image corresponds to a specific entry. Image colleting module 830 collects the entries together with the images from the instant messaging applications or input libraries, where each of the entries collected by image collecting module 830 corresponding to each of the collected images respectively is the descriptive information of the image content. Image collecting module 830 usually sorts the images according to their content types into corresponding image subsets. The implications of the content types of the images are summarized and correspond to the descriptive information of the image content of each of the images.

According to some embodiments, each of the images in the image gallery corresponds to a piece of descriptive image content information, each piece of the descriptive image content information corresponds to only one image subset, and different image subsets correspond to different image content types. One image may correspond to multiple image subsets. When one image corresponds to multiple pieces of descriptive image content information, image collecting module 830 can sort the image which corresponds to multiple pieces of descriptive image content information into one of the corresponding image subsets or into multiple corresponding image subsets. When one piece of descriptive information for an image corresponds to multiple image subsets, the image collecting module can sort that image into one of these image subsets or sort the image into several of image subsets.

When the image subsets are set by image collecting module 830, image selecting module 800 can select an image subset, select an identification image from that image, selecting a piece of hint information by image collecting module 800, and determine two image content types for the two images selected according to the piece of hint information and image content type, where the relationship of image content between one of the two image content types (the image content type of the correct image and the image content type of the image subset of the identification image) satisfies the hint information. The relationship of the other one of the two image content types and the image content type of the image subset of the identification image does not satisfy the hint information. The selecting module 800 further selects correct images from the image subset having the image content type that satisfies the hint information, and selects interference images from the image subset having the other image content types.

When the image subsets are set by image collecting module 830, the process of selecting an identification image from the image gallery by image selecting module 800 can include selecting two image subsets, selecting identification images and correct images from one of the two selected image subsets, where one of the selected images is set as the identification image, and the other is set as the correct image. The process further includes selecting interference images from the other image subset, where the hint information under this circumstance can be "similar image types," indicating to select multiple images from the other image subset as the interference images.

When the image subsets are set by image collecting module 830, the process of selecting an identification image from the image gallery by image selecting module 800 can include selecting two image subsets, selecting identification images and several interference images from one of the two image subsets, where one is set as the identification image and the other three are set as interference images, and selecting correct images from the other image subset, where the hint information can be "different image types," indicating to select an image from the other image subset as the correct image.

When the image subsets are set by image collecting module 830, the process of selecting an identification image from the image gallery can include selecting three image subsets, selecting identification images from one of the two selected image subsets, selecting correct images from another selected image subset, selecting interference images from the last selected image subset, and selecting a piece of hint information from the set of hint information, where the hint information describes the relationship of image content between the identification image and the correct image, where the relationship of image content between the identification image and the interference image does not satisfy what is described in the hint information. Image selecting module 800 can determine the relationship of image content between the identification image and the correct image based on a preset rule of determining relationships, although other methods of determining relationships can be used.

Information providing module 810 is used for providing identification images, candidate images, and relationships of image content between identification images and correct images. In particular, information providing module 810 can provide the identification images, candidate images, and hint information for a terminal device by pushing corresponding notifications to the terminal device, such as a notification based on HTTP. Moreover, information providing module 810 can transform one or more of the identification images and the candidate images and then send them to the terminal device.

According to some embodiments, information providing module 810 only transforms the images of the identification images and provides the transformed identification images, the candidate images without transformation, and the hint information for the terminal device.

According to some embodiments, information providing module 810 transforms the images of the entire candidate images and provides the identification image without transformation, the transformed candidate images, and the hint information for the terminal device.

According to some embodiments, information providing module 810 transforms the images of the identification images and all of the candidate images and provides the transformed identification images, the transformed candidate images, and the hint information for the terminal device.

The image transformations conducted on the images by information providing module 810 can include adding watermarks to images, adding shading to images, blurring the image or making the images transparent, and the like. Information providing module 810 can use existing processing algorithms to transform the images. It should be noted that the embodiment does not limit the specific implementation methods of transforming the images by information providing module 810.

Verifying module 820 is used for receiving selection information of images selected from the candidate images and for determining that the verified has been passed when the correct images are determined to be selected based on to the selection information, otherwise, for determining that the verification failed. According to some embodiments, verifying module 820 considers the verification to be passed when substantially all of the images that the user selected from the candidate images match the correct images; otherwise, the verification is considered to have failed. Embodiments of the present invention do not exclude the possibility that the verification is determined to have been passed by verifying module 820 when not all of the images that the user selected from the candidate images match the correct images.

Exemplary Verification 1: When the number of correct images is one and the user is not allowed to select multiple images, if the selection information received shows that the image the user selected is one of the correct images, verifying module 820 determines that the verification has been passed; otherwise, the verification is determined to have failed.

Exemplary Verification 2: When the number of correct images is one and the a user is allowed to select multiple images, such as two images, if the selection information received shows that the multiple images that the user selected include one of the correct images, verifying module 820 determines that the verification has been passed; otherwise, the verification is determined to have failed.

Exemplary Verification 3: Regardless of whether the number of correct images is one or more, and regardless of whether or not a user is allowed to select multiple images, if the selection information received shows that the one or more images that the user selected is or includes one of the correct images and does not include any interference images, the verification is determined to be passed using verifying module 820; otherwise, the verification is determined to have failed.

According to some embodiments, the specific methods of verifying module 820 for determining if the verification has passed or failed according to the selection information and the correct images can be set according to real needs.

According to some embodiments, a device for verifying images based on image verification codes is described, where the device uses mood images having content that explicitly describe a certain mood.

With regard to FIG. 8, a block diagram of an exemplary device for verifying images based on image verification codes is depicted according to embodiments of the present invention. Image collecting module 830 sorts collected mood images, according to their image content, into corresponding image subsets. Image collecting module 830 collects mood images and corresponding mood entries from instant messaging applications such as "Baidu Hi," "QQ," "WeChat," and the like, and input libraries such as "Baidu Keyboard," "Sougou Keyboard," "QQ Keyboard," and the like. The mood entries of the mood images collected by image collecting module 830 describe the image content of the corresponding mood image. For example, exemplary mood images and exemplary corresponding mood entries that may be collected from an instant messaging application by image collecting module 830 are displayed in FIG. 2. There are four mood images in FIG. 2; each mood image corresponds to a mood entry and the mood entries of these four mood images are, respectively, laugh 210, smile 218, sad 214, and cry 222.

In one exemplary embodiment, the mood image gallery includes two image subsets; one image subset includes images with content type "happy," which can be referred to as image subset happy, and the other image subset has images with content type "unhappy," which can be referred to as image subset unhappy. The mood images collected by image collecting module 830 can be sorted according to their mood entries into the image subset happy or the image subset unhappy. The image subset happy includes mood images having content like smile, laugh, snicker, simper, smirk, clapping, a sun smile, and the like; the image subset unhappy includes mood images having content like cry, sad, weep, and the like. There are no intersections between the image subset happy and the image subset unhappy, which means that any one of the mood image belongs to only one image subset.

The moods depicted by the mood images in the image subset happy are similar, and the moods expressed by the mood images in the image subset unhappy are also similar. The moods expressed by the mood images in the image subset happy are different (e.g., opposite) of the moods expressed by the image subset unhappy.

Next, image selecting module 800 selects a piece of hint information from a set of hint information, where there are two different pieces of hint information in the set of hint information. One piece of hint information describes similar moods, and the other piece of hint information describes opposite moods. When the number of identification images is set as one, and the number of correct images is three, if the hint information selected from the set of hint information by image selecting module 800 describes similar moods, then image selecting module 800 selects two mood images from one of the image subsets where one of the two mood images will be set as the identification image, the other one of the two mood images will be set as the correct image, and two mood images from another image subset will be set as the interference images; if the hint information selected from the set of hint information by image selecting module 800 describes opposite moods, then image selecting module 800 selects three mood images from one of the image subsets where one of the three mood images will be set as the identification image, the other two mood images will be set as the interference images, and one mood image from another image subset will be set as the correct image.

Next, information providing module 810 transforms the images of the identification image and at least one of the mood images selected from the candidate images. The transformation includes adding shading to the images or blurring the images. The transformations described in the embodiment usually do not have an adverse effect on recognition of the images.

Next, information providing module 810 provides the identification images, such as the transformed identification images or the identification images prior to the transformation; the candidate images, such as the candidate images with the transformation or the candidate images prior to the transformation; and the hint information described above. For example, information providing module 810 can send a notification including the transformed identification images, the selected candidate images, and the hint information to the terminal device. The order of the candidate images during demonstration is set randomly to avoid the correct images being fixed at a certain spot in the candidate images demonstration.

Finally, when the selection information of the image selected from the candidate images is received, verifying module 820 determines if the image selected from the candidate images is the correct image based on the selection information. If it is the correct image, the verification is determined to be passed by verifying module 820; if it is not the correct image, the verification is determined to have failed.

When the setting that the number of the identification images is one, the number of the correct images is one, and the number of the candidate images is three, where the numbers of the identification image, the correct images, and the candidate images are adjustable. Information providing module 810 can transform the identification image, or the correct image, or all of the candidate images. The mood image gallery can include two image subsets and the set of hint information can include two types of hint information. The number of the image subsets and types of information can be greater, and methods of selecting identification images, the candidate images, and the hint information can be more complicated. Image content included in the image subsets can be more abundant, such as waving images; and the relationships based on image content described in the hint information can be more complicated.

An embodiment according to the present disclosure describes a device for verifying images based on image verification codes. The embodiment uses animal images to perform the verification.

First, image collecting module 830 sorts the collected animal images according to their image content into corresponding image subsets. According to the embodiment, animal images and corresponding animal entries can be collected by image collecting module 830 from animal websites or "Baidu Images," and the animal entries of the animal images describe the image content of the corresponding animal image. In a specific example, the animal images and corresponding animal entries collected by image collecting module 830 from an animal website are displayed in FIG. 6 and FIG. 7. In FIG. 6, the animal entry defined by the animal image is cat. There are five images in FIG. 7. Each one of the animal images corresponds to a respective animal entry. The animal entries corresponding to the five animal images are a sick cat (702), six dogs (704), three dogs (708), a sleeping cat (710), and a cat with a dog (712).

According to some embodiments, the animal image gallery includes two image subsets. One image subset has images with a content type "cat," which can be referred to as image subset cat, and the other image subset has images with content type "dog," which can be referred to as image subset dog. Image collecting module 830 sorts the animal images into the image subset cat or the image subset dog according to their corresponding animal entries. The last image in FIG. 7 (712) can be omitted because it includes both a cat and a dog.

Any two of the images in image subset cat would be the same type of animal image, and any two of the images in the image subset dog would be the same type of animal image; however, the animals demonstrated by the animal images in the image subset cat are different types of animal images than the image subset dog.

Next, image selecting module 800 selects a piece of hint information from a set of hint information. For example, there may be two pieces of hint information in the set of hint information, where one of hint information describes the same type of animal and the other describes different types of animals. When the number of identification images is one and the number of the correct images is three, if the hint information selected by image selecting module 800 from the set of hint information describes the same type of animal, then two animal images can be selected by image selecting module 800 from one of the image subsets, where one of the two animal images is set as the identification image and the other is set as the correct image. Additionally, two animal images can be selected by image selecting module 800 from another image subset to be set as the interference images. If the hint information selected by image selecting module 800 from the set of hint information describes different animals, then three animal images can be selected by image selecting module 800 from one of the image subsets where one of the three animal images will be set as the identification image, the other two animal images will be set as the interference images, and one animal image can be selected by image selecting module 800 from another image subset as the correct image.

Next, information providing module 810 transforms the images of the identification image and at least one of the animal images selected from the candidate images, for example, by shading or blurring the images. The transformations described in the embodiment usually do not have an adverse effect on the identification of the images.

Next, information providing module 810 provides the identification images (before or after transformation), the candidate images (before or after transformation), and the hint information. For example, information providing module 810 can send a notification including the identification images with the transformation, the selected candidate images, and the hint information for the terminal device. The order of the candidate images during presentation to the user is set randomly by information providing module 810 to avoid the correct images being predictably fixed at a certain position presentation.

When the selection information of the image selected from the candidate images is received, verifying module 820 determines if the image selected from the candidate images is the correct image based on the selection information. If it is the correct image, the verification is determined to be passed by verifying module 820. If it is not determined to be the correct image, the verification is determined to have failed.

In one example, the number of the correct images is one, and the number of the candidate images is three, where the numbers of the identification image, the correct images, and the candidate images are adjustable. The information providing module can transform the identification image, or the correct image, or to all of the candidate images. The animal image gallery may include two image subsets and the set of hint information may include two types of hint information. However, the numbers of the image subsets and types of information can be greater, and the method of selecting identification images, the candidate images, and the hint information can be more complicated; image content included in the image subsets can be more complex, such as animated or waving images. Relationships based on image content described in the hint information can also be more complicated.

It should be noted that embodiments of the present disclosure can use an emotion image gallery to embody the method for verifying images based on image verification codes. The emotion images and the image subsets included in the emotion image gallery can be set based on the Hevner adjective ring. There are usually multiple adjectives included in the Hevner adjective ring, such as sixty-seven adjectives, and all of the adjectives are sorted into multiple types, such as eight types. All of the types form a ring according to the relationships among the adjectives, where any one of the ring has a progressive relationship with adjacent rings based on the level or magnitude of emption displayed. The specific methods for verifying images based on image verification codes are similar to the embodiments described above, which are not discussed in detail herein.

It should be noted that the present disclosure can be embodied in the formats of software and/or a combination of software and hardware. For example, each of the devices of the present disclosure can use application-specific integrated circuits or any other similar hardware to be embodied. In an embodiment, the software program of the present disclosure can embody the steps and functions described in the foregoing by a processor's execution. Similarly, the software program of the present disclosure, including related data structures, can be stored on computer-readable mediums, such as a random-access medium (RAM), a magnetic driver, a CD, a soft disk, or similar devices. Furthermore, some of the steps and functions can be embodied using hardware, such as a circuit executing each of the steps when cooperating with a processor.

It is also necessary to point out that, in the claims and specification of the present disclosure, terms such as "first" and "second" only are for distinguishing an embodiment or an operation from another embodiment or operation. It does not require or imply that those embodiments or operations have any such real relationship or order.

Moreover, when a module is referred to "couple" or "connect" to another module, it can directly couple or connect to another module or there can be a middleware. Conversely, when a module is referred to "directly couple" or "directly connect" to another module, there is not a middleware. Similar interpretations should be followed when understanding other terms used for describing relationships between modules, such as "located between . . . and . . . " compared with "directly located between . . . and . . . " and "adjacent to . . . " compared with "directly adjacent to . . . "

Further, as used herein, the terms "comprising," "including," or any other variation intended to cover a non-exclusive inclusion, such that a process, method, article, or apparatus that comprises a list of elements does not include only those elements, but may include other elements not expressly listed or inherent to such process, method, article, or apparatus. Absent further limitation, elements recited by the phrase "comprising a" do not exclude a process, method, article, or apparatus that comprises such elements from including other same elements. Elements recited in singular forms do not exclude plural forms.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for verifying images for access to a computer using image verification codes, the method comprising:
   selecting an image to be verified for access to a computer and an image verification code, the image verification code comprising candidate images from an image gallery, the candidate images comprising incorrect images and correct images to verify the image to be verified;
   providing to a user, the image to be verified, the candidate images, and hint information for the user to select correct images from the candidate images wherein the hint information comprises instructions for the user to select correct images from the candidate images by comparing the candidate images to the image to be verified, wherein the selecting the image to be verified and the candidate images from the image gallery further comprises determining one piece of hint information from a set of hint information based on comparing the image to be verified and the correct images, selecting the image to be verified from the image gallery, selecting the correct images and the incorrect images based on the selected image to be verified and the determined hint information, wherein each piece of hint information from the set of hint information represents a relationship between two images based on image content;

receiving selection information comprising a description of images selected by the user from the candidate images;

determining that verification of the image to be verified has passed when correct images are selected by the user based on the hint information; and determining that verification of the image to be verified has failed when correct images are not selected by the user based on the hint information.

2. The method of claim 1, wherein selecting the image to be verified and candidate images from the image gallery further comprises:

selecting the image to be verified and the correct images from the image gallery; and selecting the incorrect images from the image gallery according to the selected image to be verified and selected hint information.

3. The method of claim 1, wherein the image gallery comprises a plurality of image subsets, wherein the plurality of image subsets each comprise images of at least one content type, and wherein the image subsets each comprise at least one image.

4. The method of claim 3, wherein selecting the image to be verified and candidate images from the image gallery further comprises:

selecting the image to be verified from one of the image subsets of the image gallery;

determining, according to a content type of the images in the image subset from which the image to be verified is selected, the selected hint information and the content types of the images in each one of the image subsets of the image gallery, an image subset where the correct images are located, and an image subsets where the incorrect images are located; and selecting at least one image as the correct image from the image subset, wherein the correct images are located where the incorrect images are located, and at least one image is selected as the incorrect image from an image subset where the incorrect images are located.

5. The method of claim 4, wherein the content types of the image to be verified and the correct images are same or different.

6. The method of claim 1, wherein the image gallery comprises a set of mood images, and the method further comprising:

collecting mood images and corresponding mood entries; and sorting the mood images based on the corresponding mood entries, wherein the mood images having corresponding mood entries that belong to a same mood type are sorted into a same image subset.

7. The method of claim 6, wherein the content of the image to be verified and the correct images comprise similar moods or opposite moods.

8. The method of claim 7, wherein providing hint information further comprises providing instructions for transforming the image to be verified.

9. The method of claim 7, wherein providing hint information further comprises providing instructions for transforming at least one candidate image.

10. An apparatus for verifying images for access to a computer using image verification codes, comprising:

an image selecting module configured to select an image to be verified for access to a computer, and an image verification code comprising candidate images from an image gallery, wherein the candidate images comprise incorrect images and correct images corresponding to the image to be verified;

an information providing module configured to provide the image to be verified, the candidate images, and hint information comprising instructions for selecting correct images from the candidate images by comparing the candidate images to the image to be verified; and a verifying module that is configured to receive selection information of images selected by a user from the candidate images, and to determine that verification is passed when the correct images are selected based on the selection information, wherein the image selecting module is further configured to select the image to be verified from the image gallery, to determine one piece of hint information from a set of hint information according to the instructions for selecting between the image to be verified and the correct images, to select the correct images and the incorrect images based on the selected image to be verified and the determined hint information, wherein each piece of hint information from the set of hint information represents a relationship between two images based on image content.

11. The apparatus of claim 10, wherein the image selecting module is configured to:

select the image to be verified and the correct images from the image gallery; and select the incorrect images from the image gallery according to the selected image to be verified and selected hint information.

12. The apparatus of claim 10, wherein the image gallery comprises a plurality of image subsets, wherein each of the plurality of image subsets comprises images of different content types, and wherein each of the plurality of image subsets comprises at least one image.

13. The apparatus of claim 12, wherein the image selecting module is configured to:

select the image to be verified from one of the image subsets of the image gallery;

determine, based on the content type of the images in the image subset from which the image to be verified is selected, the selected hint information and content types of the images in each one of the image subsets of the image gallery, an image subset where the correct verification images are located, and an image subsets where the incorrect verification images are located; and select at least one image as the correct image from the image subset where the correct images are located, and select at least one image as the incorrect image from the image subset where the incorrect images are located.

14. The apparatus of claim 13, wherein the instructions for selecting the image to be verified and the correct images describe an identical content type between the image to be verified and the correct images and a different content types between the image to be verified and the correct images.

15. The apparatus of claim 14, further comprising:

an image collecting module configured for collecting mood images and corresponding mood entries, and for sorting, based on the mood entries, the corresponding mood images belonging to a same mood type as a same image subset.

16. The apparatus of claim 15, wherein the image collecting module is configured to collect mood images and corresponding mood entries from instant messaging applications and/or input libraries.

17. The apparatus of claim 10, wherein the information providing module is configured to:
- transform the image to be verified and/or at least one candidate image; and
- provide the image to be verified and/or at least one candidate image that have been transformed.

* * * * *